US 8,521,680 B2
Aug. 27, 2013

(12) United States Patent
Lin

(10) Patent No.: US 8,521,680 B2
(45) Date of Patent: Aug. 27, 2013

(54) INFERRING USER-SPECIFIC LOCATION SEMANTICS FROM USER DATA

(75) Inventor: Jyh-Han Lin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 12/533,837

(22) Filed: Jul. 31, 2009

(65) Prior Publication Data

US 2011/0029474 A1 Feb. 3, 2011

(51) Int. Cl.
G06N 5/02 (2006.01)
G06F 17/30 (2006.01)

(52) U.S. Cl.
USPC .......................................................... 706/55

(58) Field of Classification Search
USPC .......................................................... 706/55
See application file for complete search history.

(56) References Cited

U.S. PATENT DOCUMENTS

| | | | |
|---|---|---|---|
| 6,983,203 B1 * | 1/2006 | Wako | 701/533 |
| 7,383,316 B2 | 6/2008 | Koch et al. | |
| 7,532,899 B2 | 5/2009 | Wilson et al. | |
| 2005/0043060 A1 | 2/2005 | Brandenberg et al. | |
| 2007/0270166 A1 | 11/2007 | Hampel et al. | |
| 2008/0070593 A1 | 3/2008 | Altman et al. | |
| 2008/0086455 A1 | 4/2008 | Meisels et al. | |
| 2008/0183828 A1 | 7/2008 | Sehgal et al. | |
| 2008/0214204 A1 | 9/2008 | Ramer et al. | |
| 2009/0100018 A1 * | 4/2009 | Roberts | 707/3 |
| 2009/0105947 A1 | 4/2009 | Nachesa et al. | |
| 2009/0111487 A1 | 4/2009 | Scheibe | |

FOREIGN PATENT DOCUMENTS

| | | |
|---|---|---|
| EP | 2015101 A2 | 1/2009 |
| KR | 1020070073087 A | 7/2007 |

OTHER PUBLICATIONS

Oh, et al., "User-centric Integration of Contexts for a Unified Context-aware Application Model", Retrieved at <<http://ftp.informatik.rwth-aachen.de/Publications/CEUR-WS/Vol-149/paper03.pdf>>, ubiPCMM 2005, pp. 9-16.

Gruhn, et al., "Semantic Locations in Online Communities", Retrieved at <<http://ieeexplore.ieee.org//stamp/stamp.jsp?tp=8,arnumber=04338353>>, International Conference on Semantic Computing, Sep. 17-19, 2007, pp. 224-231.

Wagner, et al, "Contextual Intelligence for Mobile Services through Semantic Web Technology", Retrieved at <<http://ftp.informatik.rwth-aachen.de/Publications/CEUR-WS/Vol-194/paper4.pdf>>, 3rd European Semantic Web Conference (ESWC'06), Jun. 2006, pp. 5.

Hu, et al. "A Semantic Context Model for Location-Based Cooperative Mobile Computing", Retrieved at <<http://ieeexplore.ieee.org/stamp/stamp.jsp?arnumber=04288732>>, Jun. 24-28, 2007, pp. 326-331.

Unknown, "delicioussocial bookmarking: Learn More about Delicious," Retrieved at <<http://delicious.com/help/learn>> on Jun. 18, 2009, pp. 2.

(Continued)

Primary Examiner — Jeffrey A Gaffin
Assistant Examiner — Ola Olude Afolabi

(57) ABSTRACT

Determining semantics for locations based on user data such as user activities and/or user communications. The user data is captured and analyzed to identify keywords including locations. Location data describing the locations is obtained and associated with the user and keywords. The associations represent user context for the locations. The associations are used to deliver services and/or products to the user at various times such as when user approaches or enters a particular location.

20 Claims, 5 Drawing Sheets

(56) References Cited

OTHER PUBLICATIONS

Unknown, "About Flickr," Retrieved at <<http://www.flickr.com/about>>, Yahoo! Inc., 2009, pp. 3.
"International Search Report", Mailed Date: Jan. 26, 2011, Application No. PCT/US2010/044041, Filed Date: Jul. 30, 2010, pp. 9.
"China Notice on the First Office Action", Mailed Date: Aug. 17, 2012, Application No. 201080033362.0, Filed Date: Jul. 30, 2010, pp. 6.
"Notice on the Second Office Action China", Mailed Date: Jan. 11, 2013 Application No. 201080033362.0, Filed Date: Jul. 30, 2010, pp. 1-10.

* cited by examiner

US 8,521,680 B2

INFERRING USER-SPECIFIC LOCATION SEMANTICS FROM USER DATA

BACKGROUND

Electronic calendar data, to-do lists, and other user-specific data often identify particular locations. Existing systems identify the locations by place names such as the names of stores, restaurants, street addresses, or latitude/longitude coordinates. In some instances, however, the same location can have different meaning for the same user depending on factors such as the time of day. For example, a local coffee house may be the location where the user obtains breakfast in the morning and the same location where the user attends a book club meeting at night. Similarly, the user may attend a wedding reception at a local banquet hall on one day and then attend a baby shower at the same banquet hall another day. In this example, the location has multiple meanings for the same user. Existing systems fail to identify and distinguish between the different contexts that apply to the same location for a particular user.

SUMMARY

Embodiments of the invention infer location-specific user context. User data is received from one or more computing devices. The received user data describes user activities and/or user communications. The user data is analyzed to identify location keywords associated with the user data. The location keywords include locations, for example. The user, location keywords, and location data for the locations are stored as one or more associations representing user context for the locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable, at least, a determination of user context for locations. By inferring user context, aspects of the disclosure enable context-aware matching and delivery of relevant services to users 102 at the locations. For example, in addition to providing the determined or inferred user context for the locations to the users 102, the user context may be leveraged by developers to provide web services and application programming interfaces (APIs) for location semantics 212 and location intelligence 214.

Figure 1:
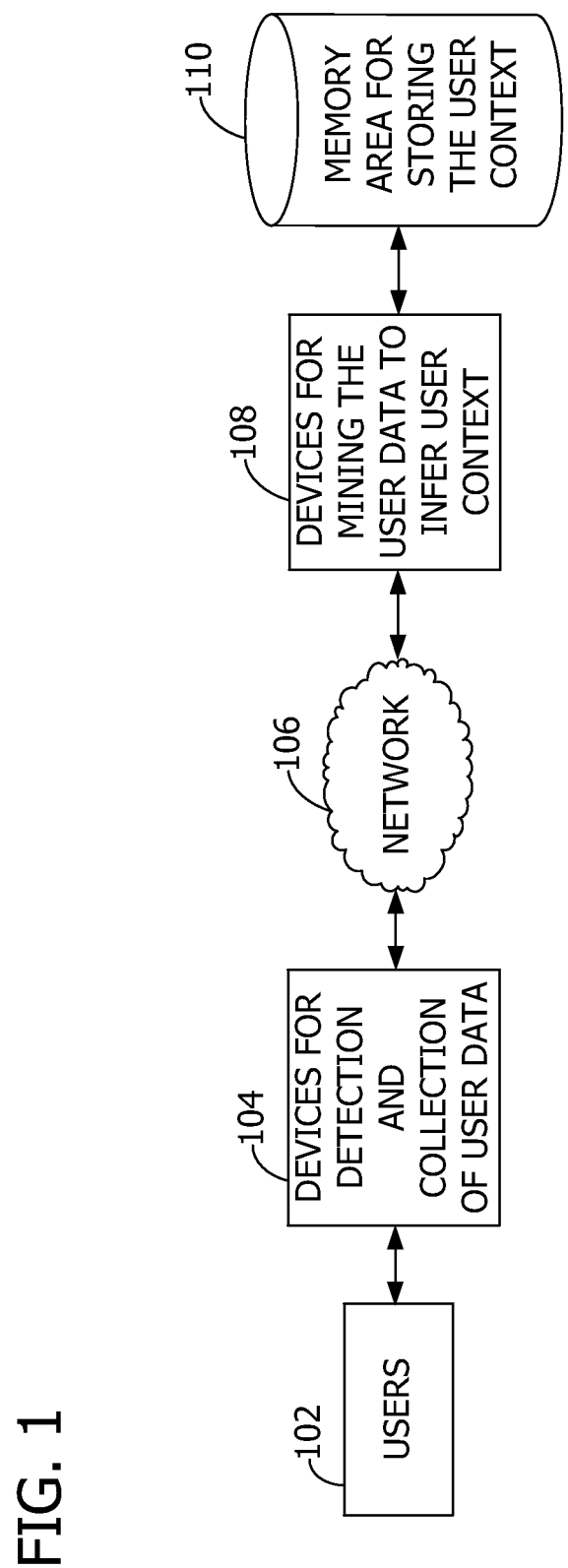
FIG. 1 is an exemplary block diagram illustrating the collection of user data from a plurality of users by a plurality of devices.

Referring again to FIG. 1, an exemplary block diagram illustrates the collection of user data 408 such as user activities 202 and/or user communications 204 from a plurality of users 102 by a plurality of devices 104. In some embodiments, the user data 408 is transient. The plurality of devices 104 detects and/or collects the user data 408 from the user 102. For example, the devices 104 include, but are not limited to, mobile telephones, laptop computers, netbooks, digital cameras, digital video cameras, gaming consoles (including handheld gaming consoles), portable music players, personal digital assistants, information appliances, personal communicators, and any other computing devices of the users 102. In some embodiments, the devices 104 include computing devices remote from the users 102, yet accessible by the users 102. Such computing devices include, for example, server computing devices, peer computing devices, local or remote network packet sensors, and the like.

The devices 104 detect user activities 202 and/or user communications 204 and collect at least a portion of the detected activities and/or communications. The collected data is stored in a memory area associated with the devices 104, in a memory area 110 associated with devices 108 that analyze the collected data (e.g., mining), and/or in one or more other memory areas. The devices 108 mine the user data 408 collected by the detection devices 104 to infer user context. The user context is stored in the memory area 110. The memory area 110 includes any memory area internal to, external to, or accessible by the devices 108.

A network 106 connects the detection devices 104 and the mining devices 108. There may also be a network (not shown) between the users 102 and the detection devices 104, and between the mining devices 108 and the memory area 110. The network 106 includes any wired or wireless network including, but not limited to, cellular networks, intranets, the Internet, and BLUETOOTH brand wireless networks.

Figure 2:
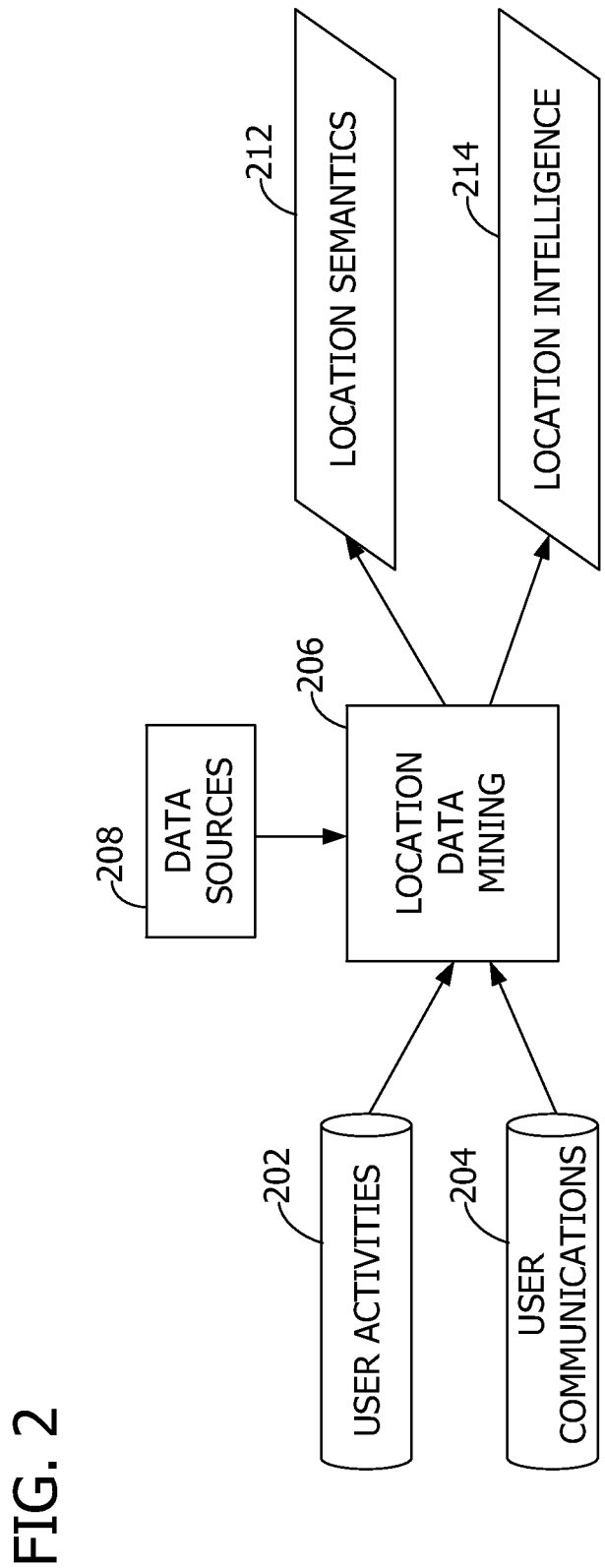
FIG. 2 is an exemplary block diagram illustrating the generation of location semantics and intelligence based on user activities and user communications.

Referring next to FIG. 2, an exemplary block diagram illustrates the generation of location semantics 212 and location intelligence 214 based on the user activities 202 and the user communications 204. The user activities 202 are detected, accessed, received, obtained, or the like for location data mining 206. The user activities 202 may be explicit or implicit. Exemplary explicit user activities 202 include one or more of the following: calendar entries, task entries, to-do lists, and shopping lists. Exemplary implicit user activities 202 include, but are not limited to, commercial transactions (e.g., purchasing merchandise, buying movie tickets, etc.) and consumption of domain-specific mobile services. Domain-specific mobile services include turn-by-turn navigation, point-to-browse real estate information retrieval, point-to-shop price comparison, photo shooting, photo tagging, and more.

Similarly, the user communications 204 are detected, accessed, intercepted, received, obtained, or the like for the location data mining 206. Exemplary user communications 204 include one or more of the following: electronic mail messages, instant messages, text messages, blog postings, microblog postings (e.g., "tweets"), photo postings, web site postings, voice telephone calls, and video telephone calls. The user communications 204 include communications in which the user 102 is the originator and communications in which the user 102 is the recipient.

The location data mining 206 obtains location data from one or more data sources 208 based on the user activities 202 and the user communications 204. The data sources 208 include databases, web sites (e.g., user profile web pages, social networking web sites), or any other repositories of information. The location data describes or provides more information related to the user activities 202 and the user communications 204.

In some embodiments, the location data mining 206 is implemented as application programs executing on one or more computing devices 108. For example, the functionality of the location data mining 206 may be distributed across a plurality of computing devices 108 (e.g., cloud computing).

The location data mining 206 outputs location semantics 212, location intelligence 214, and other mined data. Location semantics 212 describe the meaning associated with a particular location based on the input user activities 202 and/or user communications 204. For example, the location data mining 206 accesses the data sources 208 to match particular locations derived from the user activities 202 and/or user communications 204 to landmarks, shops, attractions, etc. Location intelligence 214 includes, for example, information describing the particular locations. For example, if one of the locations corresponds to a restaurant, the location data mining 206 accesses the data sources 208 to obtain location intelligence 214 such as a review, rating, menu, or list of available reservation times.

Figure 3:
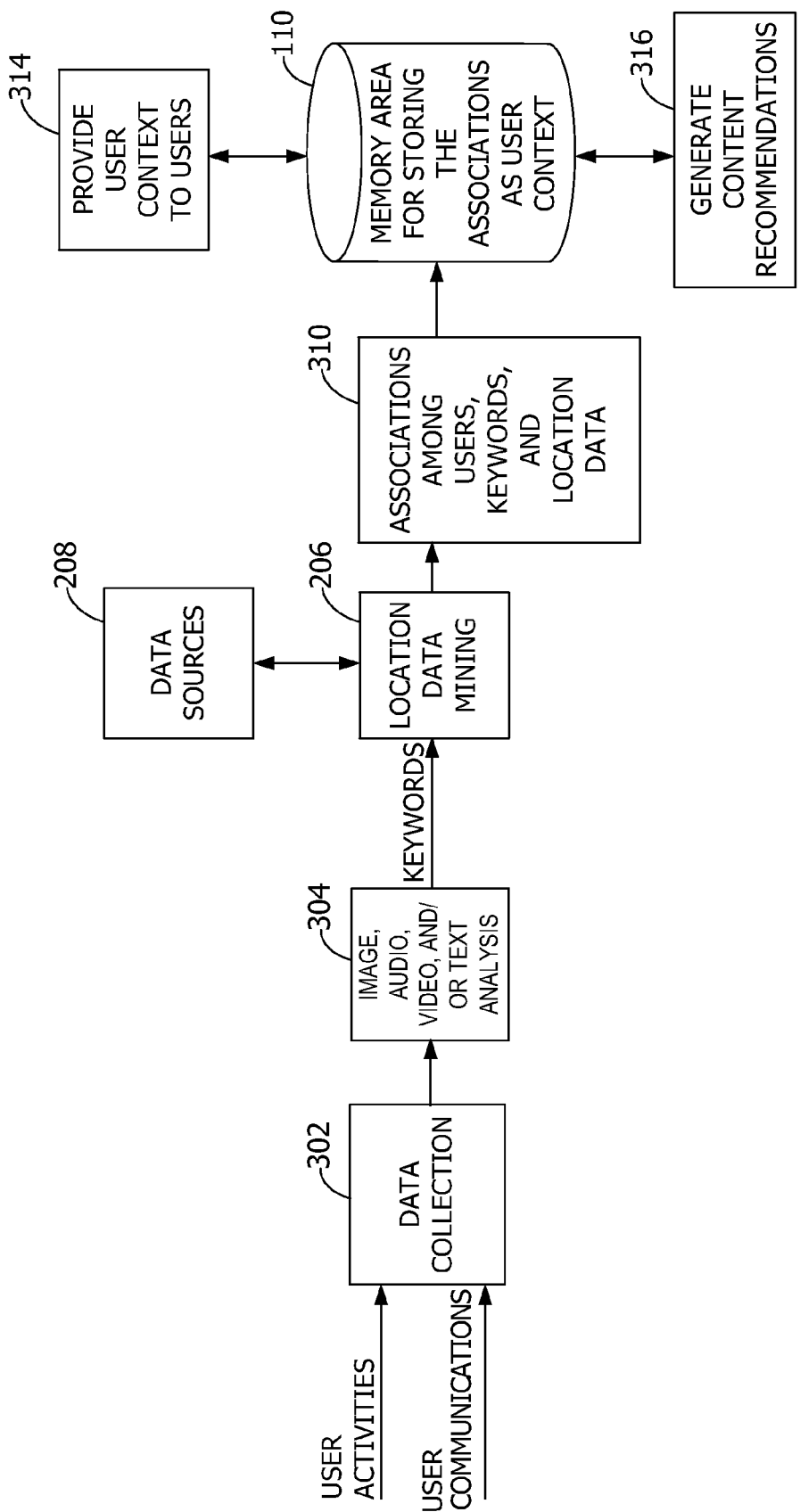
FIG. 3 is an exemplary block diagram illustrating the analysis of collected user data to infer user context.

Referring next to FIG. 3, an exemplary block diagram illustrates the analysis of collected user data 408 to infer user context. A data collection 302 module captures, intercepts, receives, or otherwise accesses user activities 202 and/or user communications 204. The accessed activities and/or communications are input into an image, audio, video, and/or text analysis 304 module. The image, audio, video, and/or text analysis 304 module performs an analysis to identify keywords (e.g., location keywords). The keywords include, for example, names of people, locations, items, and times. The location data mining 206 uses the keywords to extract location data from the data sources 208. The location data includes, for example, the location semantics 212 and location intelligence 214 illustrated in FIG. 2.

In the example of FIG. 3, the data collection 302 and image, audio, video, and/or text analysis 304 functionality are illustrated as separate elements from location data mining 206. However, the various functions performed by data collection 302, image, audio, video, and/or text analysis 304, and location data mining 206 may be divided into any quantity of elements, or performed by a single functional element.

One or more associations 310 are created among the users 102, keywords, and extracted location data. For example, each of the users 102 may have one association 310 for each location. This results in a plurality of associations 310 for each of the users 102. In some embodiments, the associations 310 represent user context for the locations identified from the user activities 202 and/or user communications 204.

The created associations 310 are stored in the memory area 110 as the user context. For example, the associations 310 may be stored as an n-tuple conforming to the following format <user, location, tags>. An example includes <Jane, 2411 Main Street, CoffeeHouse, 6 am-5 pm, BOGO lattes after 9 am>. In this example, the location is the street address 2411 Main Street, and there are three tags. One tag identifies the name of the establishment at the street address, another tag identifies the hours of operation of the establishment, and another tag identifies a buy-one-get-one (BOGO) offer. The data in the tags reflects the location data obtained from the data sources 208.

In some embodiments, the tags in the associations 310 take the form of name-value pairs or key-value pairs. For example, the associations 310 may be stored in the following format <user, location, name=value, name=value, . . . >. An example includes <Jane, 2411 Main Street, restaurantname="CoffeeHouse", hours="6 am-5 pm", coupon="BOGO lattes after 9 am">. The names or keys in this format may be organized into categories based on the location (e.g., restaurants, shopping, museums, etc.).

Embodiments of the disclosure use the stored associations 310 to enhance the user experience. For example, the associations 310 may be provided at 314 to the user 102 in the form of a user profile. Additionally, the associations 310 may be used to generate content recommendations at 316. In some embodiments, use of the associations 310 is triggered based on time and/or a present location of the user 102. Continuing the example above, if the user 102 is near 2411 Main Street and the time is 9:15 am, embodiments of the disclosure present the BOGO offer to the user 102.

Figure 4:
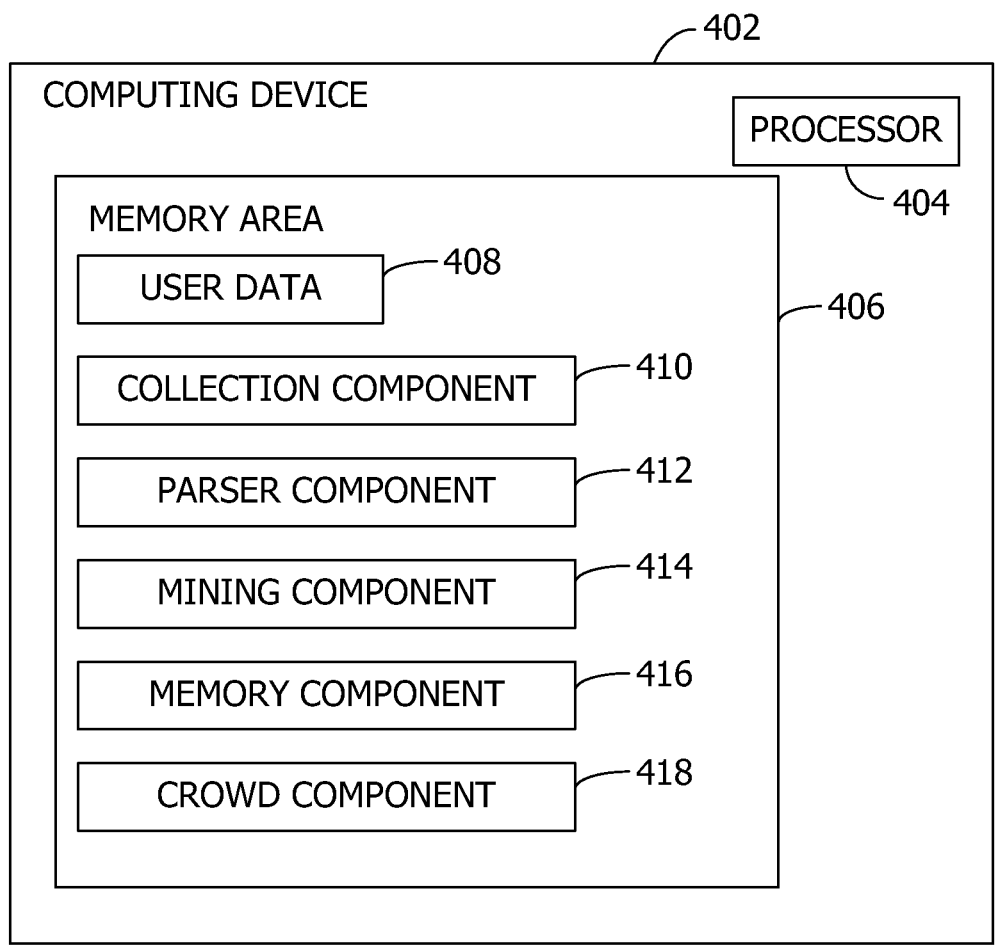
FIG. 4 is an exemplary block diagram illustrating a computing device having computer-executable components for inferring location-specific user context from user data.

Referring next to FIG. 4, an exemplary block diagram illustrates a computing device 402 having computer-executable components for inferring location-specific user context from user data 408. The computing device 402 implements functionality from one or more of the following: data collection 302, image, audio, video, and/or text analysis 304, and location data mining 206 from FIG. 3. The computing device 402 includes at least a memory area 406 and a processor 404. In FIG. 4, the memory area 406 is within the computing device 402. However, the memory area 406 or any of the data stored thereon may be associated with any server or other computer, local or remote from the computing device 402 (e.g., accessible via a network). For example, the memory area 406 may be implemented as cloud storage.

The memory area 406, or other computer-readable media, stores user data 408 for one or more users 102. The user data 408 includes, for example, the user activities 202 and/or user communications 204 as illustrated in FIG. 2.

The memory area 406 further stores computer-executable components for implementing aspects of the disclosure. Exemplary components include a collection component 410, a parser component 412, a mining component 414, a memory component 416, and a crowd component 418. The collection component 410, when executed by the processor 404, causes the processor 404 to receive the user data 408 for the users 102 from one or more computing devices such as devices 104 from FIG. 1. The parser component 412, when executed by the processor 404, causes the processor 404 to identify the location keywords associated with the user data 408 received by the collection component 410. In some embodiments, the location keywords include or correspond to one or more locations (e.g., stores, restaurants, street addresses, landmarks, and the like).

The mining component 414, when executed by the processor 404, causes the processor 404 to obtain location data for the locations corresponding to the location keywords identified by the parser component 412. As described herein, the location data includes any data describing the locations or providing additional information about the locations. The memory component 416, when executed by the processor 404, causes the processor 404 to associate the location data obtained by the mining component 414 and the location keywords identified by the parser component 412 with the users 102. For each of the users 102, the associated location data defines user context for that user 102 for the respective location.

While the user context is separately defined for each of the users 102 in some embodiments, other embodiments contemplate the calculation or determination of context for locations based on the location data associated with a plurality of the users 102 (e.g., a social group). The users 102 may belong to multiple social groups, and may want to project different persons in the various groups. In such embodiments, the location data mining 206 is extended to recognize group activities and group communications, and maintain social group affiliations for the users 102.

In an example in which the location is a coffee house, embodiments of the disclosure may analyze the location data for the plurality of the users 102 to identify the most popular coffee drink ordered at the coffee house. Such information represents location-specific context for the plurality of users 102, and may be added to one or more of the contexts for particular users 102. For example, a tag identifying the determined most popular coffee drink may be added to the user context for users 102 who opt in to receive such updates to their location-specific contexts. As another example, the determined most popular coffee drink may be identified to the coffee house as part of a service providing market data to companies. The companies can use the market data for marketing, advertising, and other business management and development reasons.

Additional calculations or determinations may be performed on the location data or associations 310 among the users 102 and the corresponding location data. For example, in some embodiments, temporal metrics may be calculated between trigger events such as entering a queue for an attraction, leaving the queue, and exiting from the attraction. Exemplary metrics include, but are not limited to, time spent at the locations, a wait time for an attraction, a wait time for a restaurant, and a frequency of visits to the locations.

Further, the metrics may be used to identify or update points of interest for one of the users 102 or common to a plurality of the users 102 providing the user data 408. For example, if the user 102 spends a particular threshold amount of time in an unknown location and frequents the unknown location often, that metric acts as a trigger for embodiments of the disclosure to conduct deeper searches of available data sources 208 to create a point of interest for the unknown location. In some embodiments, the user 102 is prompted to manually enter semantic location data for the unknown location, or help capture location data using a camera or other recording devices.

In another example, the crowd component 418, when executed by the processor 404, causes the processor 404 to analyze the user context defined by the memory component 416 to identify points of interest for the plurality of users 102. The points of interest describe locations in a way that has meaning for a particular group of users 102 whose activities and/or communications enabled identification of the points of interest. As an example, if some of the users 102 meet at a particular location to discuss books, the name of the location may be CoffeeHouse but the point of interest derived from the activities and communications of the users 102 is "Book Club Meeting." Referred to as heat maps or flash crowd triggers, embodiments of the disclosure also count and analyze user search, pointing, scanning, photo shooting, image recognition, commerce transaction, price comparison events, and the like to detect new points of interest. The points of interest are created and updated on an ongoing basis (e.g., daily, weekly, monthly) responsive to the received user activities 202 and/or user communications 204 to detect deviations or other changes. When changes are detected, aspects of the disclosure conduct searches of the data sources 208 to update the location semantics 212. Alternatively or in addition, a quantity of the users 102 associated with the changed point of interest are selected (e.g., via a survey with random or targeted sampling) and prompted to confirm the changes and to assist in updating the location semantics 212.

In some embodiments, the mining component 414 is limited by one or more of the following: geospatial restrictions, social graph restrictions, temporal restrictions, activity restrictions, and statistical sampling. Exemplary geospatial restrictions include, but are not limited to, the most frequently visited places, locations with commercial activities, and user-defined location/place collections. Exemplary social graph restrictions include, but are not limited to, contacts, first and second-degree connections, and commercial transactions or communication counterparts. Exemplary temporal restrictions include, but are not limited to, calendar events, non-recurrent events, work or non-work hours, and commute busy hours. Exemplary activity restrictions include, but are not limited to, product and information searches, purchasing, and business meetings.

The processor 404 includes any quantity of processing units, and is programmed to execute computer-executable instructions for implementing aspects of the disclosure. The instructions may be performed by the processor 404 or by multiple processors executing within the computing device 402, or performed by a processor external to the computing device 402 (e.g., by a cloud service). In some embodiments, the processor 404 is programmed to execute instructions such as those illustrated in the figures (e.g., FIG. 5).

Figure 5:
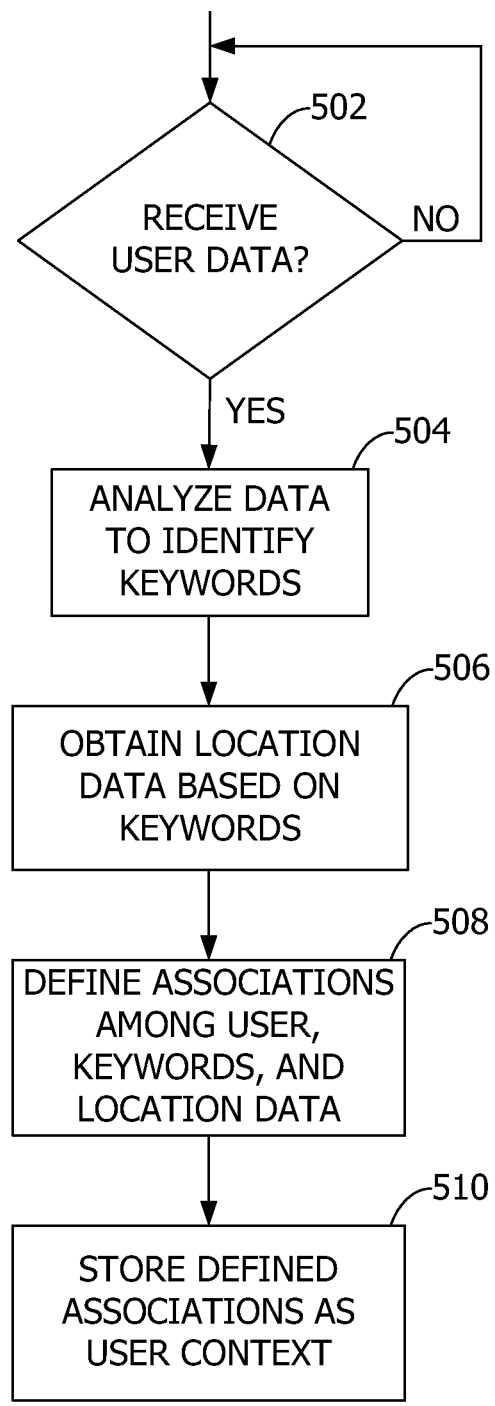
FIG. 5 is an exemplary flow chart illustrating the collection and analysis of user data to infer user context for a location.

Referring next to FIG. 5, an exemplary flow chart illustrates the collection and analysis of user data 408 to infer user context for a location. If user data 408 is received at 502 from computing device such as devices 104 (e.g., data relating to the user activities 202 and/or user communications 204), the user data 408 is analyzed at 504 to identify keywords associated with the user data 408. For example, a text analysis, image analysis, and/or audio analysis are performed on the user data 408. In some embodiments, nouns and verbs of the activities are identified from the user data 408. For example, if the user data 408 include a calendar event such as "eat dinner at Sushi Place with Amy," the words "eat," "dinner," "Sushi Place," and "Amy" are selected as keywords. In another example, if the user data 408 includes an instant message such as "babysitting Jonathan at country club by swimming pool," the words "babysitting," "Jonathan," "country club," and "swimming pool" are selected as keywords. The keywords include location keywords that correspond to locations (e.g., "Sushi Place," "country club," "swimming pool").

The identified keywords act as triggers to obtain location data at 506. The location data represents location-specific knowledge. Embodiments of the disclosure may obtain a uniform resource locator (URL) of a web site of one of the location keywords, and then extract from the web site additional information about the location. From the examples above, the location data obtained for "Sushi Place" may include the restaurant type, rating, pricing, menu, hours of operation, and directions listed on the "Sushi Place" web site. Further, the location data obtained for "babysitting" may include a list of babysitting opportunities posted on the country club web site.

One or more tags or other semantic artifacts may be created to store the obtained location data. One or more associations 310 are defined at 508 among the users 102 corresponding to the user data 408, the identified location keywords, and the obtained location data (e.g., the tags). The defined associations 310 are stored in the memory area 110 at 510 as location-specific and user-specific context.

The stored associations 310 may be used for many purposes. For example, as one of the users 102 approaches or enters a location, embodiments of the invention search for that location in the stored associations 310 for the user 102.

For example, the location keywords in the stored associations 310 may be searched to find a matching association. If there is an association 310 for that location, the location data, or a portion thereof, from the association 310 is obtained and provided to the user 102 in some form. For example, the location data may be provided to the user 102 for display, or a product or service may be selected based on the location data. The selected product or service is presented to the user 102 when the user 102 enters the location, or while the user 102 remains in the location. Alternatively or in addition, a user interface is created or modified based on at least a portion of the location data from the matched association. The user interface is provided to the user 102, for example, as the user 102 enters the location, while the user 102 is at the location, or as the user 102 leaves the location.

For example, as the user 102 approaches a coffee house, the associations 310 are searched to identify the association 310 corresponding to the coffee house location. If found, the association 310 is parsed to extract one or more items of the location data. For example, a list of recently ordered coffee drinks may be extracted from the association. The extracted information is provided to the user 102 as the user 102 enters the coffee house. In this example, the list of recently ordered coffee drinks had been stored in the association 310 previously (e.g., after the immediate previous visit by the user 102 to the coffee house).

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for mining data associated with the user 102 and the locations, and exemplary means for obtaining the location data.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for inferring location-specific user context, said system comprising:
a memory area for storing user data for a user, said user data describing one or more of the following: user activities and user communications; and
a processor programmed to:
perform an analysis of the user data stored in the memory area to identify one or more location keywords, said location keywords corresponding to one or more locations;
obtain location data for the locations corresponding to the identified location keywords;
create one or more tags based on the obtained location data;
define one or more associations among the user, the identified location keywords, and the created tags;
store, in the memory area, the defined associations as user context for the locations; and
generate temporal metrics for the defined associations by analyzing the user data.

2. The system of claim 1, wherein the location keywords comprise one or more of the following: names of places and names of people.

3. The system of claim 1, wherein the user activities comprise one or more of the following: calendar entries, task entries, to-do lists, and shopping lists.

4. The system of claim 1, wherein the user communications comprise one or more of the following: electronic mail messages, instant messages, text messages, blog postings, microblog postings, web site postings, voice telephone calls, and video telephone calls.

5. The system of claim 1, wherein the generated temporal metrics comprise one or more of the following: time spent at the locations, a wait time for an attraction, a wait time for a restaurant, and a frequency of visits to the locations.

6. The system of claim 1, further comprising:
means for mining data associated with the user and the locations; and
means for obtaining the location data.

7. A method comprising:
receiving user data for a user from one or more computing devices, said received user data describing one or more of the following: user activities and user communications;
analyzing, by a processor, the received user data to identify one or more location keywords associated with the received user data, said location keywords corresponding to one or more locations;
obtaining location data for the locations corresponding to the identified location keywords;
defining, by the processor, one or more associations among the user, the identified location keywords, and the obtained location data;
storing, by the processor in a memory area, the defined associations as user context for the locations; and
generating, by the processor, temporal metrics for the defined associations by analyzing the received user data.

8. The method of claim 7, further comprising:
selecting at least one service based on the stored associations; and
providing the selected service to the user at one or more of the locations.

9. The method of claim 7, further comprising:
creating one or more tags based on the obtained location data; and
storing the created tags with the stored associations in the memory area.

10. The method of claim 9, further comprising:
determining a present location of the user;
selecting at least one of the created tags based on the determined present location; and
presenting a user interface to the user based on the selected tags.

11. The method of claim 7, further comprising:
detecting a present location of the user;
comparing the detected location with the location keywords;
selecting at least one of the associations based on said comparing; and
presenting to the user at least a portion of the location data corresponding to the selected association.

12. The method of claim 7, further comprising defining a point of interest based on the obtained location data and the generated temporal metrics.

13. The method of claim 12, further comprising modifying the defined point of interest based on the generated temporal metrics.

14. The method of claim 7, wherein the generated temporal metrics comprise one or more of the following: time spent at the locations, a wait time for an attraction, a wait time for a restaurant, and a frequency of visits to the locations.

15. One or more computer devices storing computer-executable components, said components comprising:
a collection component that when executed by at least one processor causes the at least one processor to receive user data for a plurality of users from one or more computing devices, said received user data describing one or more of the following: user activities and user communications;
a parser component that when executed by at least one processor causes the at least one processor to identify one or more location keywords associated with the user data received by the collection component, said location keywords corresponding to one or more locations;
a mining component that when executed by at least one processor causes the at least one processor to obtain location data for the locations corresponding to the location keywords identified by the parser component;
a memory component that when executed by at least one processor causes the at least one processor to associate the location data obtained by the mining component and the location keywords identified by the parser component with the plurality of users to define user context for the locations, and generate temporal metrics for the defined user context by analyzing the received user data; and
a crowd component that when executed by at least one processor causes the at least one processor to analyze the user context defined by the memory component to identify points of interest for the plurality of users.

16. The computer devices of claim 15, wherein the mining component is limited by one or more of the following: geospatial restrictions, social graph restrictions, temporal restrictions, activity restrictions, and statistical sampling.

17. The computer devices of claim 15, wherein the crowd component updates the points of interest based on the user context defined by the memory component.

18. The computer devices of claim 15, wherein the mining component accesses social networking data via a network to obtain at least a portion of the location data.

19. The computer devices of claim 15, wherein the memory component stores the user context as a data structure for each of the plurality of users in the form of <user, location keywords, location data>.

20. The method of claim 7, wherein the user communications comprise one or more of the following: electronic mail messages, instant messages, text messages, blog postings, microblog postings, web site postings, voice telephone calls, and video telephone calls.

* * * * *